Dec. 4, 1973  G. N. HARRINGTON ET AL  3,776,790
SUEDE-LIKE MATERIALS
Filed Dec. 4, 1970  5 Sheets-Sheet 1
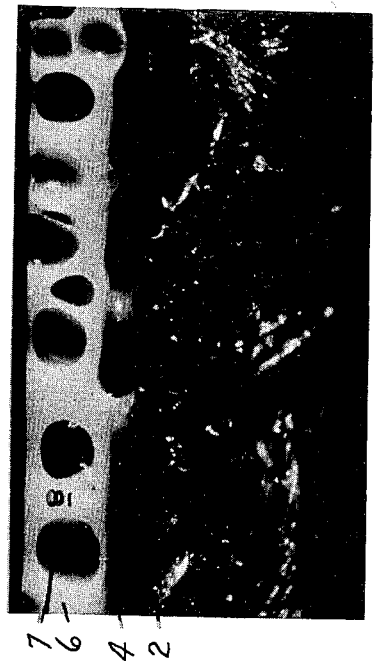
FIG. 2
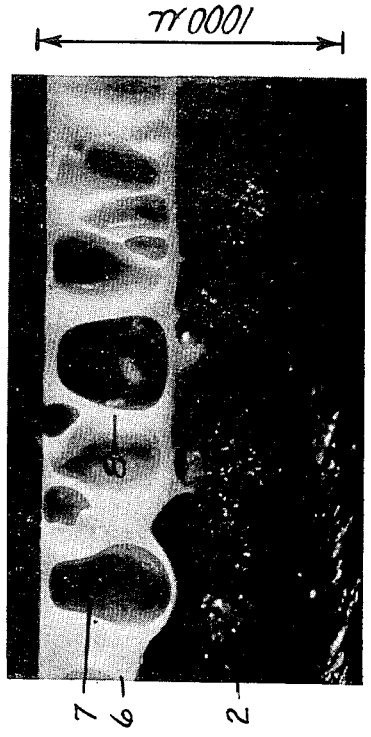
FIG. 3
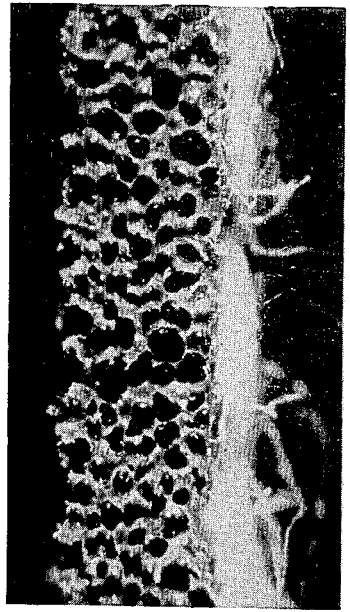
FIG. 1
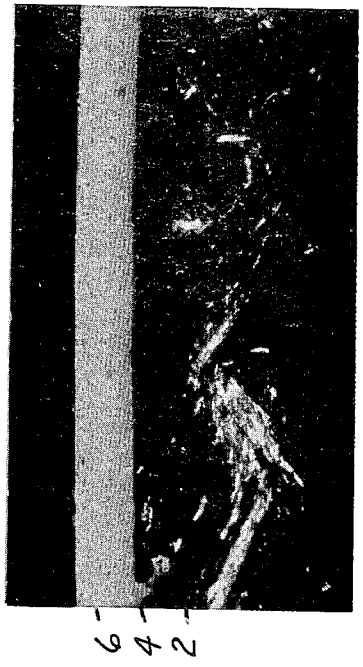
FIG. 1A
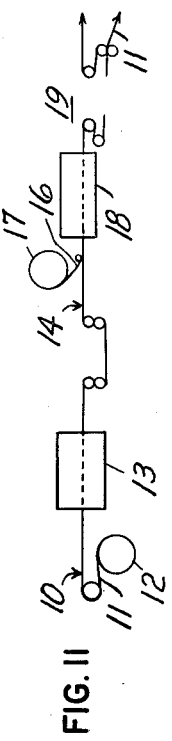
FIG. II United States Patent Office 3,776,790
Patented Dec. 4, 1973

3,776,790
SUEDE-LIKE MATERIALS
Gene Norman Harrington, Monmouth, Maine, and Frank Peter Civardi, Wayne, N.J., assignors to Inmont Corporation, New York, N.Y.
Filed Dec. 4, 1970, Ser. No. 95,173
Int. Cl. B32b 5/20
U.S. Cl. 156—79     16 Claims

ABSTRACT OF THE DISCLOSURE

A suede-like material is produced by expanding a thin layer of fused deaerated vinyl plastisol, containing a blowing agent, on a backing to form a layer of vertically elongated cells covered by a thin skin, which is then removed by abrasion.

---

Figure 6:
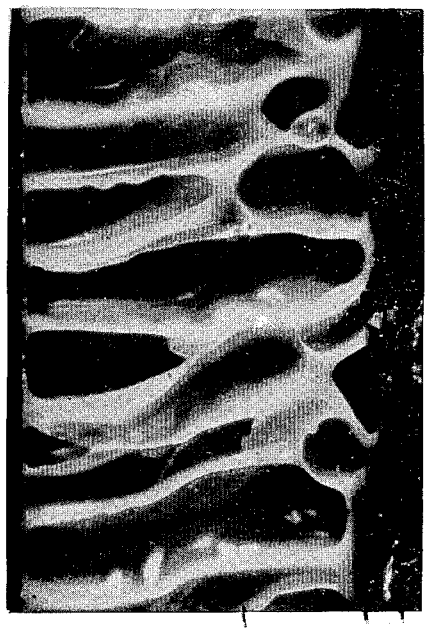

This invention relates to the production of artificial suede-like sheet materials.

Materials having a more or less suede-like indented surface of plasticized polyvinyl chloride resin are disclosed in many patents and publications, including such U.S. patents as Stiehl 2,811,464; Bowin 2,837,440; Segner 2,835,607; Hamway 3,041,193; Jilge 2,983,960; Myers et al. 3,054,691; Hulslander 3,284,274; Barlow 3,312,586 and such British patents as 938,891; 975,615; 1,158,471. One typical commercially available material (which is believed to be made by applying a layer of foamable vinyl plastisol to a fabric backing, heating the material to fuse the plastisol and cause it to foam up (and abrading the surface) is illustrated in FIG. 1.

The present invention provides novel suede-like materials and a novel process for making them from vinyl plastisols. In one form of the invention there is obtained, by a special technique, a blown vinyl plastisol having relatively large parallel columnar cells side by side and having a thin upper surface skin which can be removed to produce the suede-like material.

The process of the present invention employs a polyvinylchloride plastisol containing a blowing agent. Foamable plastisols containing blowing agents which cause the release of gas when the mixture is heated to effect fusion of the plastisol are well known in the art. (See, for instance, the article "Formulating Chemically Blown Plastisol Foam" by Werner in the October 1961 issue of Modern Plastics, as well as such U.S. patents as 3,197,423, 3,446,693, 3,305,496, and 3,321,413.) In the practice of the present invention the plastisol is deaerated. It is indeed conventional to deaerate vinyl plastisols intended for use in the manufacture of smooth surfaced unblown products, the purpose of the deaeration being to reduce or eliminate the number of tiny, but frequently visible, pores in the surface of the final fused smooth-surfaced product. But, in the manufacture of blown material from vinyl plastisols containing blowing agents, it is conventional to employ undeaerated vinyl plastisols which contain the fine air bubbles that result from the operation of mixing the powdered polyvinyl chloride resin with the plasticizer; as stated in the Werner article deaeration results in a considerable loss in cell quality.

In a preferred aspect of this invention the plastisol contains an amount of blowing agent such that on full expansion of the fused plastisol its volume is well above three times and preferably above four times the original unblown volume (e.g. about 4½ or 5 to 6 times the unblown volume). It is not necessary that the foamable plastisol be fully blown during the process. Instead, the thin layer of foamable plastisol may be heated at such a temperature and for such a time as to effect its fusion and partial expansion, and the blowing may be discontinued (e.g. by cooling the material to below the blowing temperature) when it has expanded to somewhat less than the maximum possible (e.g. to less than 90%, or less than 80%, of the maximum, but to above 2½ times, say about 3 to 3½ or 4 times) the original unblown volume.

Figure 7:
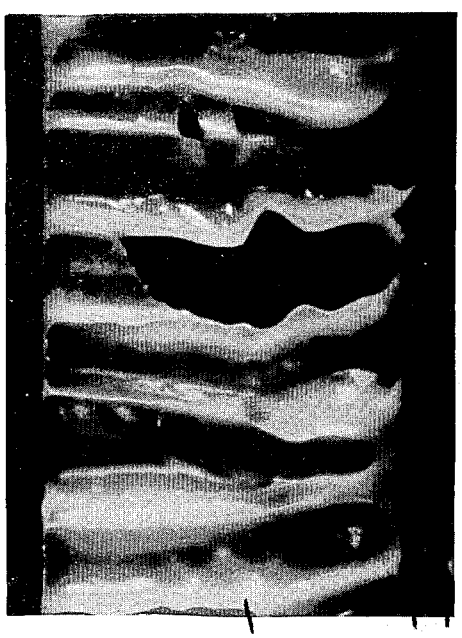
Figure 4:
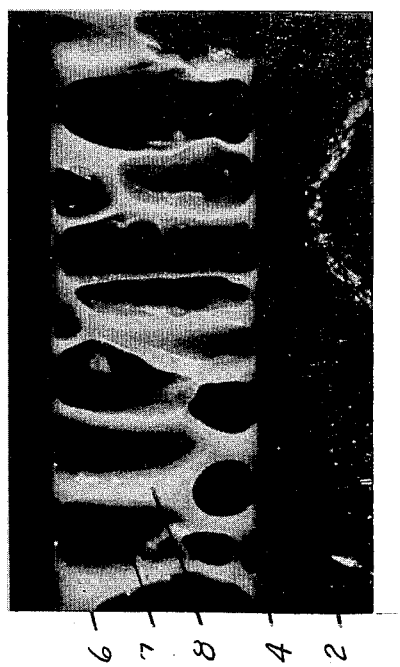
Figure 5:
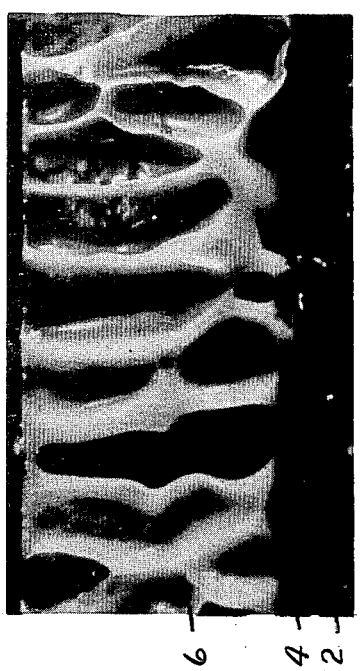
Figure 9:
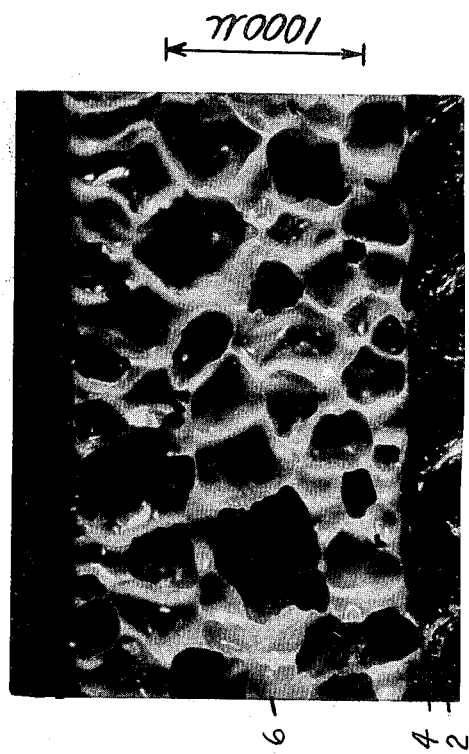
Figure 10:
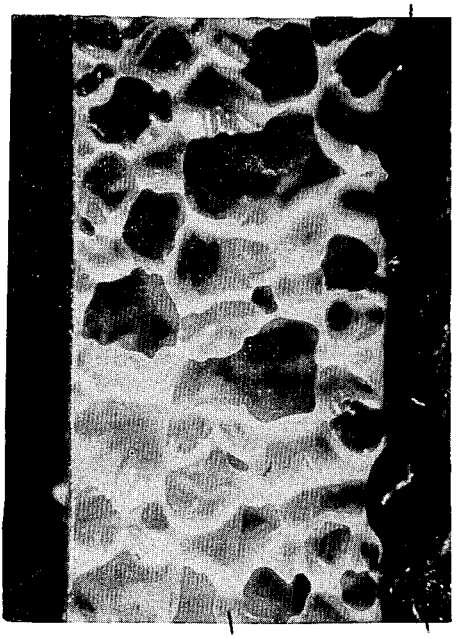
Figure 7A:
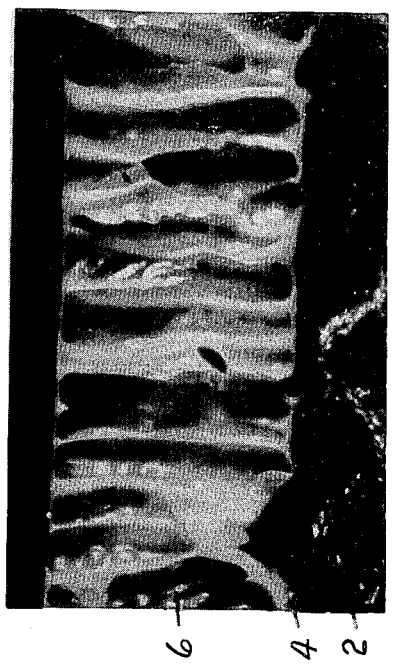
Figure 8:
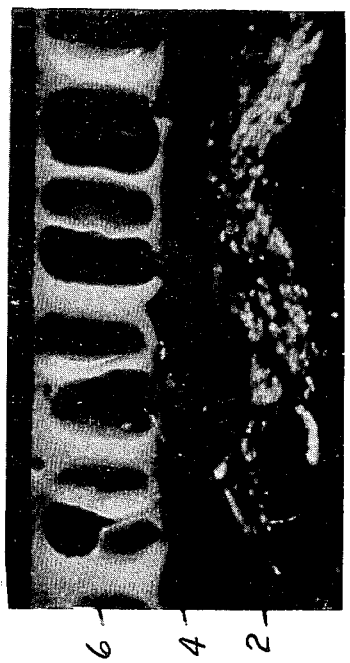

One typical blowing sequence that is effected in the practice of this invention is illustrated in the photomicrographs FIGS. 1A to 10 which are views of cross-sections of a product made by: casting a layer of the plastisol containing blowing agent onto release paper; gelling the foamable plastisol layer by heating for a short time sufficient to solidify its surface; casting thereover a thin layer of a plastisol free of blowing agent; then laying onto that thin layer, a sheet of woven fabric; finally heating the assemblage, while supported horizontally, in a hot air oven in which the air was at the indicated temperature; and then cooling and stripping off the release paper. The products were produced by heating for the specified times in an oven having the specified air temperature, as follows: FIG. 1A, about 1 minute at 360° F.; FIG. 2, about 1½ minutes at 360° F.; FIG. 3, about 2 minutes at 360° F.; FIG. 4, about 2½ minutes at 360° F.; FIG. 5, about 2¾ minutes at 360° F.; FIG. 6 about 3 minutes at 360° F.; FIGS. 7 and 7A (which show the same product, at different magnifications) about 3½ minutes at 360° F.; FIG. 8, about 2½ minutes at 350° F.; FIG. 9 about 2½ minutes at 380° F.; FIG. 10, about 2½ minutes at 390° F. (Because the microscope used for these photographs did not have a great depth of field, and because the cross-sections were not precisely perpendicular, portions of the views are somewhat out of focus, but it is believed that the structures of the foamed layers will nevertheless be apparent.)

The heating may be discontinued while the cells or pores still have a generally cylindrical parallel upright shape (FIG. 5 or 8) or when they have expanded to form upstanding more or less parallel pear-like shapes. These different degrees of expansion give different characteristics to the final product obtained after abrading. Thus after hand-sanding to remove the surface skin the suede-like product obtained from the material shown in FIG. 5 is finer textured and somewhat harder than the softer, coarser textured sanded product obtained from the material shown in FIG. 7.

In each of these FIGS. 1A to 10 the fabric layer is indicated by reference numeral 2 and the layer of plastisol free of blowing agent is indicated by reference numeral 4. The layer of plastisol containing blowing agent is indicated by reference numeral numberal 6, cells therein being indicated by reference numeral 7 and cell walls by reference numeral 8.

It will be noted that in FIG. 1A both the layers 4 and 6 are grainy and appear to contain small voids; this may be an indication that fusion is not complete. (It should also be noted that, presumably due to unevenness in the application of heat, some minor and occasional portions of the sample made at 1 minute at 360° F. do show the presence of some cells or pores whose size approaches those shown in FIG. 2.)

In the drawings, each photomicrograph has a scale showing the length of 1000 microns at the magnification at which the photomicrograph was taken.

FIGS. 1A to 10 indicate that (with the particular deaerated plastisol formulation used) the blowing process proceeded as follows. Initially there were formed small side-by-side pores or cells (some 150 to 200 microns across); see FIG. 2. As blowing proceeded these cells were restrained, by the presence of adjacent cells, from expansion in a direction widthwise of the horizontal layer of plastisol but expanded vertically, see FIG. 7 in which the cells are some 200–300 microns across and some 800–900 microns high and FIG. 5 in which the cells are some 220 microns across and some 600–650 microns high. Use of higher temperatures and more rapid expansion gave cells which were more globular and more randomly arranged.

It will be understood the cells generally do not all extend precisely perpendicular to the plane of the surface and are not of precisely uniform diameter (see FIG. 6 for instance). Accordingly, in making the cross-sections by cutting perpendicularly through the thickness of the material with an instrument such as a razor, the instrument may cut through the somewhat slanting wall separating two adjacent cells so that the cross-section (as in FIGS. 6, 7 and 7A, for instance) shows the lower portion of one cell and, directly above it, the upper portion of an adjacent cell.

As those skilled in the art will readily appreciate, the exact result obtained will depend on the characteristics of the particular plastisol. Thus when one conventional blowable plastisol formulation was deaerated, spread in a thin layer and then given a controlled heat treatment for fusing and blowing the plastisol, with the heat treatment being discontinued well before full blowing had been attained, the final fused layer had a single row of side-by-side parallel vertical generally cylindrical cells, but these cells were quite squat, their heights being about the same as or less than, their diameters. By modifying the formulation to increase the proportion of blowing agent and reduce the viscosity of the mixture, as by adding an appreciable amount of high boiling diluent (such as a high flash naphtha), a structure having more elongated vertical generally cylindrical cells was produced. With the teachings of the present application before them those skilled in the art will be readily able to choose and vary the formulations so as to promote the formation of such elongated cells and also to control the heating conditions to that end. Thus, a series of experiments to determine the conditions for producing elongated cells from a conventional formulation (as illustrated in Example 4 below) was completed within less than two hours.

In one embodiment, the formulation may be one which has a relatively low fusion temperature so that the vinyl resin reaches a fused state before significant blowing occurs. For instance, in one form the plasticizer may be largely of the high solvating type, such as butyl benzyl phthalate.

The presence of a volatile high-boiling diluent may contribute to the attainment of best results, as previously indicated. Thus one type of formulation contains a hydrocarbon diluent (which does not dissolve or fuse with the polyvinyl chloride resin at the heating temperatures employed) and which boils at about the temperatures used for decomposing the blowing agent. One suitable diluent is an aromatic hydrocarbon fraction boiling in the range of about 310–345° F. The proportion of diluent may be in the range of, say about 1 to 20% of the plastisol.

As indicated above, deaeration is a conventional procedure in the making of unblown products of pigmented vinyl plastisol. After deaeration, the upper surface of a quiescent mass of plastisol, in a container, is smooth and specular, giving a clear reflection, like a mirror. In contrast, before deaeration, the reflection from the upper surface is diffuse, not mirrorlike, and there may be visible tiny bubbles or pits in the surface. Also the upper surface of the undeaerated material often has a streaky or marbleized appearance, presumably due to the effect of the dispersed air on the light reflecting characteristics of the pigment; when one draws down a cast film of such an undeaerated plastisol (in conventional manner by means of a horizontal doctor blade) the surface of the film often shows visible streaks running in the draw down direction (that is, in direction of the relative movement of plastisol and doctor blade). Deaeration may be effected by subjecting the plastisol to a vacuum, e.g. in an agitated vessel or in an apparatus in which the plastisol is in a thin or shallow layer. This causes the plastisol to bubble violently. As is well known in the art, it is not necessary to continue the treatment until bubbling ceases; a short treatment (e.g. for a few minutes at room temperature using a subatmospheric pressure of say 1 mm. of mercury absolute) is sufficient for practical deaeration. The principal source of the air is believed to be that which is occluded on and within the particles of polyvinyl chloride resin and which is thus carried into the plastisol when the resin particles are stirred with, and wet by, the plasticizer. In contrast, the pastes formed by milling fine particles of pigment, blowing agent, etc. with plasticizer carry little if any occluded air (owing to the effect of the milling operation). Thus it is not necessary that the whole plastisol mixture be deaerated; it is enough that one deaerate the mixture of resin particles and plasticizer without pigment or blowing agent and then carefully add milled dispersions of the latter ingredients in plasticizer. For best results in the present invention, however, it is found that the air content of the plastisol should be quite low; for instance the pigmented plastisol should be deaerated until its air content is such that a shallow sample of the plastisol (in a round vertical flat-bottomed cylindrical vessel of 2-inch internal diameter) ½ inch deep, under a pressure of 1 mm. Hg absolute, gives off air in distinct countable bubbles, generally at the rate of less than 5 bubbles per second and most preferably less than 2 bubbles (e.g. 1 bubble) per second.

In one preferred embodiment of the invention, illustrated in FIG. 11, the foamable plastisol layer is deposited (as at casting head 10) onto a smooth support (such as release paper 11 taken from a roll 12 thereof) and then "gelled" (but not fused or blown) by heating as in an oven 13. A thin layer of non-foaming plastisol is then deposited (as at casting head 14) onto the gelled layer, after which a layer of fabric (e.g. a woven, knitted, felted or other non-woven fabric 16, taken from a roll 17 thereof) is laid onto the non-foaming plastisol. The whole assemblage is then heated in an oven 18 to effect fusion of both plastisol layers and controlled blowing. Thereafter the assemblage is cooled (as in zone 19) to set the fused plastisol and the release paper 11 is stripped off. The whole process, preferably a continuous one, is illustrated in FIG. 11. The oven is advantageously one which supplies heat to both the top and bottom surfaces of the horizontal assemblage passing through the oven; thus the oven may be an air oven in which a series of parallel closely spaced hot air jets are directed at high velocity (e.g. 4000 feet per minute) at these surfaces or it may be of the radiant heating type. Since, as indicated previously, the type of cellular structure obtained is dependent on the heating conditions it is advantageous to have the heating controlled so that it is substantially uniform across the width of the advancing sheets; if desired, however, special effects, e.g. striped effects, may be obtained by varying the heating conditions across said width.

Also, those skilled in the art will appreciate that the precise heating conditions will depend on the equipment used for heating, which will govern in large part the rate at which heat is transferred to the plastisol film. Thus with any particular type of equipment, preliminary trials are generally desirable to facilitate the choice of preferred heating conditions.

The presence of the layer of non-foaming plastisol between the fabric and the foamable material is helpful in controlling the cell structure; this layer may make heat transfer to the foamable layer more uniform and prevent the cells from orienting themselves in conformity to the threads of the fabric. The plastisol used to make this layer need not be completely free of blowing agents; for instance it may contain a small amount of blowing agent, such as an amount sufficient to expand that layer by, say, 50% or 100%.

It is also desirable to have one surface of the foamable plastisol (namely the surface which is to be abraded later) in contact with conventional release paper (or similar smooth material to which the fused plastisol is substantially non-adherent and from which it can be easily stripped, after cooling, without damage to the fused plastisol). As can be seen in FIGS. 2, 4 and 8 for instance, the free surface of the expanded material which was in contact with the release paper has a very thin smooth skin; as seen in FIG. 8 the thickness of the skin over most of the area is less than 50 microns. This skin can be removed or torn up, as by abrading in a controlled manner to expose the cellular structure below.

Figure 12:
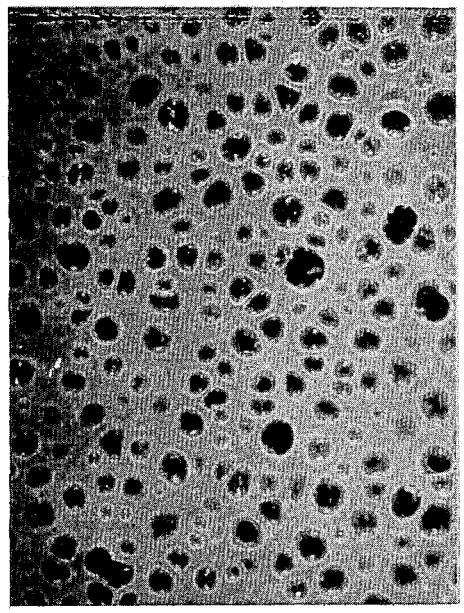

The nature of the skin is illustrated in FIG. 12 which is a photomicrograph showing a top view of another unsanded product within the scope of this invention. It will be seen that the surface is characterized by circular "windows," in this case roughly 40 microns to 300 microns in diameter; the majority of these windows are not open to the atmosphere but are covered by a transparently thin skin, but several of the windows have smaller openings (e.g. those indicated by reference numeral 21) extending therethrough or are (as at 22) completely open to the atmosphere.

Figure 13:
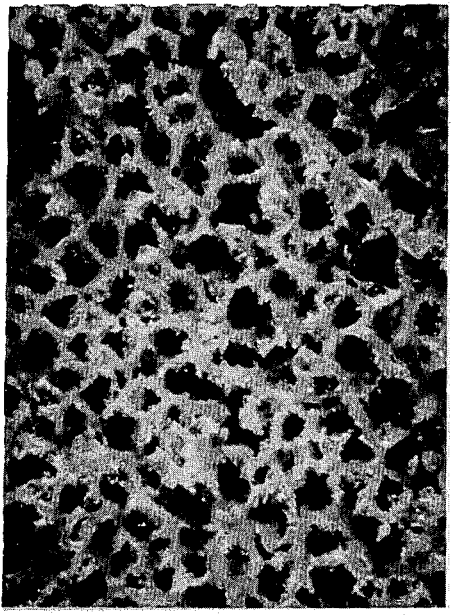
Figure 15:
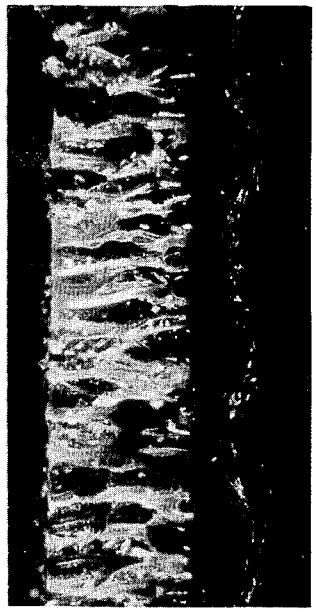
Figure 14:
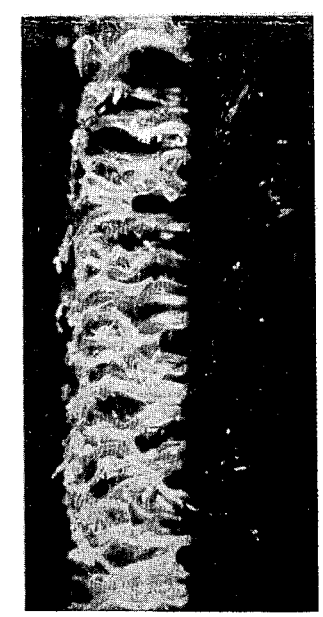

The effect of removal of the skin is illustrated in the photomicrographs of FIGS. 13–15. FIG. 13 shows a top view of the product of FIG. 12 after machine sanding. FIG. 14 shows a cross sectional view of that machine-sanded material, and FIG. 15 shows a cross-sectional view of the product of FIG. 12 after hand sanding. It is evident that more tearing of the thinner portions of the vertical cell walls has occurred in the production of the material of FIG. 14, making the remaining walls more independently movable.

In one preferred form of the invention the thickness of the foamed layer of columnar cells (and the long dimensions of those cells) is in the range of about 250 to 1000 microns, more preferably about 400 to 1000, and the diameters of the columnar cells are within the range of about 100 or 150 to 300 microns and are less than the long dimensions (e.g. heights) of said cells. In producing this foamed layer, one preferably starts with an unblown blowable layer whose thickness is at least 100μ and less than 400μ, preferably less than 300μ. The thickness of the non-blown (or lightly blown) intermediate layer is preferably in the range of about 20 to 300 microns, but it may be considerably thicker (e.g. 1000 microns) if desired.

The direction of the columnar cells may be altered after blowing. For instance if the assemblage coming from the fusing oven is passed around a roller before the fused plastisol has cooled thoroughly and while the material is still hot enough to be easily deformable permanently the surface which is in contact with the roller will tend to move faster than the opposite surface, thereby tilting the columnar cells so that their long axes are no longer substantially normal to said surfaces but are at an angle (e.g. 45°) thereto. On cooling, the cells are set in their tilted positions, giving (on abrasion of the thin surfaced layer) a suede-like material which has a "grain" in one direction.

Instead of (or prior to) abrading the thin skin on upper surface of the material the material may be cut with a knife to remove that skin and any desired portion of the underlying cellular structure. It has been found that such cutting can be performed easily and accurately with the equipment conventionally employed for the splitting of leather, using rotating knives. It would be expected that the frictional heating caused by contact with the high speed knife (whose cutting edge may be moving at say, 800 feet per minute) would result in surface (or other) fusion of the thermoplastic material. No evidence of such fusion is observed. The thin skin removed by the knife may, if desired, also be put to use. Thus, it may be laminated to a support such as a fabric (e.g. a knit or woven fabric) by means of a suitable adhesive (e.g. a polyvinyl chloride plastisol of low fusing point, a polyvinyl acetate latex, etc.).

The polyvinyl chloride resins, plasticizers, stabilizers, activators, blowing agents and pigments used in the practice of this invention may be those conventionally employed in the vinyl plastisol art, such as those shown in the references previously cited.

In the practice of this invention the proportion of plasticizer is preferably in the range of about 40–80 parts (e.g. about 60 or 70 parts) per 100 parts of polyvinyl chloride. Plasticizers for use in plastisols are well known. They include such materials as carboxylic and phosphate esters, e.g. dibutyl sebacate, dioctyl sebacate, dioctyl adipate, didecyl adipate, dioctylazelate, triethylene glycol di(2-ethylhexanoate), diethyl glycol dipelargonate, triethylene glycol dicaprylate, dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate, tricresyl phosphate, octyl diphenyl phosphate, epoxidized glyceride oils, such as epoxidized soybean oil, etc.

The preferred blowing agent is azodicarbonamide. The use of other blowing agents is well known in the art and is also within the broader scope of the invention. These known blowing agents include, among others, compounds having $>N-N<$ or $-N=N-$ linkages which decompose at elevated temperatures to yield a gas mixture high in nitrogen, e.g. substituted nitroso compounds, substituted hydrazides, substituted azo compounds and the like, such as dinitrosopentamethylenetetramine, p,p - oxybis (benzene sulfonyl hydrazide), azobisisobutyronitrile, and N,N-dimethyl-N,N-dinitrosoterephthalamide.

The polyvinyl chloride resins suitable for plastisols are well known in the art. They may be simple unmixed homopolymers or copolymers, including terpolymers, containing over 60%, usually well above 80%, vinyl chloride polymerized therein. Generally they are linear polymers which are capable of fusion with the plasticizer to form a uniform blend and are supplied as fine particles having particle sizes of about 0.02 to 2 microns.

The following examples are given to illustrate this invention further. In this application all proportions are by weight unless otherwise indicated. In the examples, the pressure is atmospheric and the temperature is room temperature unless otherwise indicated.

EXAMPLE 1

A plastisol is prepared by mixing 100 parts of polyvinyl chloride powder (Pliovic D–100X, a high molecular weight polyvinyl chloride homopolymer having an I.V. of 1.20); 30 parts of butyl benzyl phthalate (a high solvating plasticizer sold as "Santicizer 160"); 8 parts of a mixture of equal of (a) a finely divided blowing agent, namely azodicarbonamide (such as Celogen AZ), (b) a liquid plasticizer in which the blowing agent is dispersed, namely di-2-ethylhexyl phthalate (usually known as "DOP") (c) a heat-stabilizer for the polyvinyl chloride which also serves as an activator to reduce the decomposition temperature of the blowing agent, namely a zinc-containing stabilizer such as "Mark 282" of Argus Chemical Co.; 4 parts of a paste which is a dispersion of 2 parts of the same finely divided blowing agent in 2 parts of DOP; 2 parts of a surfactant, namely polyethylene glycol monolaurate-400 (sold as Aldosperse L–9); 40 parts of a dispersion of finely divided pigment in plasticizer; and 30 parts of high flash naphtha ("Hi-Sol 10" of Chemical Solvents, Inc., an aromatic hydrocarbon cut boiling in the range of about 310–345° F.).

More particularly, the 30 parts of butyl benzyl phthalate are first mixed with 20 parts of the naphtha, then the surfactant and the blends containing blowing agent are added, followed by the addition of the pigment dispersion. The polyvinyl chloride resin powder is then added slowly and then, as the mixture starts to thicken, the other 10 parts of the naphtha are added. The ingredients are thoroughly mixed; during mixing the blend is beaten to break up any lumps that may form. There is thus produced a viscous liquid mixture like syrup, having many visible air bubbles. This blend is then substantially deaerated by subjecting it to a vacuum, e.g. to a vacuum of about 29 to 30 inches of mercury (at a temperature about 25° C.), forming a froth whose large bubbles burst during the treatment. The resulting liquid mixture is substantially free of visible air bubbles.

The deaerated liquid is then spread as a coating 0.007 inch (about 180 microns) thick on conventional smooth release paper ("Transcote") and placed for a short time (e.g. 1½ minutes) in a hot air oven maintained at 300° F., and then removed into the atmosphere and allowed to cool. This heating step causes the coating to solidify or "gel" but the resin is not completely solvated and the coating is weak and unblown.

A layer of non-blowing plastisol about 0.004 inch (about 100 microns) in thickness is then applied over the gelled plastisol and a woven cotton fabric (weighing about 8 oz. per square yard) is then laid smoothly and lightly onto this liquid plastisol coating. The assemblage is then passed horizontally through an oven in which air at a temperature of 370° F. is blown at high speed at the top and bottom of the assemblage. This causes the first plastisol layer to blow to a blow ratio of about 5:1 (that is its thickness increases to about 5 times its last thickness) and fuses both plastisol layers and bonds the fabric to the fused plastisol. The release paper is then removed in the usual way after cooling, leaving a smooth-surfaced coated fabric.

The exposed surface of the blown layer is then abraded to remove or break up the overlying skin and expose the columnar cells and also to break, at least partially, the vertical walls separating such cells. More particularly it is abraded, in two passes, by means of an oscillating sander, using an abrasive drum carrying 120 grit silicon carbide abrasive. In the first pass through the sander about 0.005 to 0.007 inch of the blown layer is sanded off, exposing the open cell structure. In the second pass, there is very slight contact between sanding surface and the exposed surface and a fibrous nap is raised on the material.

EXAMPLE 2

Example 1 is repeated, but using an oven temperature of 365° F. A similar structure is obtained. The blow ratio is 3.8:1.

EXAMPLE 3

A plastisol is prepared by mixing 100 parts of polyvinyl chloride powder (resin Bakelite QYJV-1); 27 parts of diisodecyl phthalate; 18.3 parts of butyl benzyl phthalate (a high solvating plasticizer sold as "Santicizer 160"); 7.8 parts of the blowing agent-plasticizer-stabilizer mixture used in Example 1; 3.5 parts of the pasty 1:1 dispersion of blowing agent in DOP used in Example 1; 1.6 parts of a surfactant, namely polyethylene glycol monolaurate-400 (sold as Aldosperse L-9); 5.3 parts of a dispersion of finely divided carbon black in plasticizer; and 3.9 parts of the high flash naphtha of Example 1.

After mixing and deaerating as in Example 1, an assemblage of release paper, foamable plastisol, non-foaming plastisol and fabric is formed as in Example 1.

The assemblage is then placed for 2½ minutes in a hot air oven having a temperature of 370° F. This causes the first plastisol layer to expand to a blow ratio in the neighborhood of 3½:1, and fuses both plastisol layers and bonds the fabric to the fused plastisol. The release paper is then removed in the usual way, leaving a smooth-surfaced coated fabric. Microscopic examination of the coating shows that the blown layer has columnar cells. On abrading to remove the surface skin a suede-like product is produced.

EXAMPLE 4

In this example there is used a plastisol made by mixing 100 parts of polyvinyl chloride resin (Marvinol VR-53, an intermediate molecular weight homopolymer of vinyl chloride having a specific viscosity of 0.36), 70 parts of DOP; 10 parts of the phosphate plasticizer known as Santicizer 141; 8.8 parts of the blowing agent-plasticizer-stabilizer mixture used in Example 1; 15 parts of finely divided calcium carbonate (Duramite of Thompson, Wyman and Co.); and 10 parts of a 12% dispersion of black pigment (Mogul A) in DOP.

In all the experiments described in this Example 4 a layer of plastisol is drawn down (i.e. spread with a doctor knife) on release paper (indicated by reference numeral 9), the layer on the paper is gelled in an oven, and then, after intermediate cooling, is placed in a hot air oven again to effect fusion and blowing.

Figure 16:

(a) The plastisol, without deaeration, is formed into a layer about 0.014 inch (about 370 microns) thick and (after gelling) heated in air at 380° F. for 3 minutes. The blow ratio is about 4:1. A cross-section of the product is shown in FIG. 16; it will be seen that it has globular cells.

(b) Example 4(a) is repeated except that deaerated plastisol is used. The product again has globular, and irregular, cells, but they are generally larger and less uniform.

(c) Example 4(b) is repeated using a lower temperature, namely 350° F., for 4 minutes. The product expands considerably less but the cells are more or less arranged side by side, there being two horizontal rows of such cells, one above the other, indicating the presence of two layers of cells, each layer being about one cell in thickness. On further heating, (after intermediate cooling to room temperature) for 5 minutes in air at 340 to 350° F. the product expands further to a total blow ratio in the neighborhood of 4:1. In cross section there now appear two horizontal rows of parallel aligned vertically elongated cells, one above the other, indicating the presence of two horizontal layers of cells, each layer having a thickness about equal to the vertical dimension of the cells. (In this example the plane of the support (the release paper) is "horizontal.")

Figure 17:

(d) Example 4(b) is repeated except that the thickness of the drawn down layer is only about 0.007 inch (about 180 microns). The blow ratio is about 3.6:1. A cross-section of the product is shown in FIG. 17; the presence of globular cells, some of which are horizontally extended, is evident.

Figure 18:
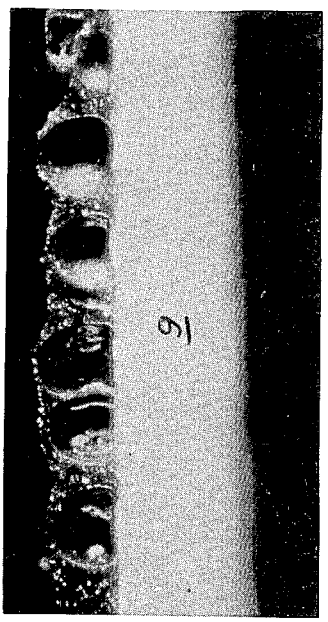

(e) Example 4(d) is repeated except that the heating (after gelling) is for 4 minutes in air at about 345° F. A cross-section of the product is shown in FIG. 18; it will be seen that it has a single row of squat cells whose thickness is about equal to that of the expanded plastisol layer. It will be noted that the exposed surface is bumpy; this often occurs when there is no layer of unblown plastisol to restrain uneven expansion at that surface.

Figure 19:
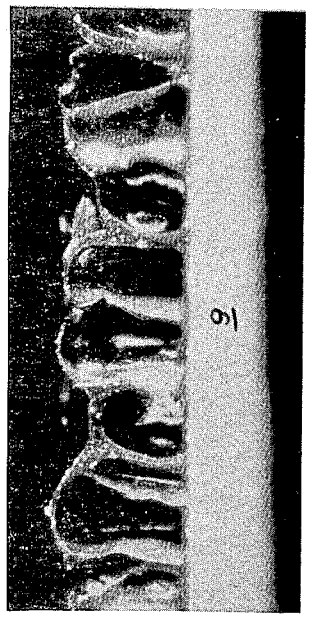

(f) Example 4(e) is repeated except that the product (after gelling) is heated for 6 minutes in air at about 345° F. The blow ratio is about 2.5–3:1. A cross-section of the product is shown in FIG. 19; it will be seen that it has a single row of vertically elongated cells.

As indicated earlier, Example 4 involves a quick series of experiments to determine the conditions for producing elongated cells from a given formulation of conventional type. In this series the plastisol (in b, c, d, e and f) was deaerated rapidly, and not to the optimum degree.

EXAMPLE 5

A plastisol is prepared by mixing 100 parts of the polyvinyl chloride resin of Example 3; 40 parts of the butyl benzyl phthalate; 8 parts of the blowing agent-plasticizer-stabilizer mixture used in Example 1; 4 parts of the pasty 1:1 dispersion of blowing agent in DOP used in Example 1; 2 parts of the surfactant used in Example 1; 3 parts of the high flash naphtha used in Example 1 and 43 parts of a dispersion of red pigment in plasticizer. The plastisol is deaerated and used to form the specimens which are shown in FIGS. 2 to 10.

EXAMPLE 6

A plastisol is prepared by mixing 400 parts of the resin ("QYJV-1") of Example 3, 34.8 parts of the phosphate plasticizer known as Santicizer 141, 70.4 parts of DOP, 8 parts of the surfactant of Example 1, 12 parts of the high flash naphtha of Example 1, 51.6 parts of finely divided calcium carbonate and 136 parts of a 12% dispersion of black pigment in DOP. To 178.2 parts of the resulting mixture there are added 4 parts of the paste used in Example 1 (i.e. 2 parts azodicarbonamide in 2 parts DOP) and 2.7 parts of the cadmium-zinc liquid heat-stabilizer (and activator for the blowing agent) known as "Mark 229" of Argus Chemical Co. The mixture is then thoroughly deaerated and spread as a layer about 0.008 inch (about 195 microns) thick on conventional smooth release paper (which is about 0.006 inch thick) and gelled by heating in an oven for a very short period (as in Ex. 1). A thin layer (about 0.003 inch thick) of non-blowing plastisol is then spread onto the gelled foamable layer and the assemblage is then placed for five minutes in a hot air oven having a temperature of 360° F. A very good elongated cell structure is obtained.

EXAMPLE 7

Example 1 is repeated using a plastisol prepared by mixing 100 parts of the resin of Example 1; 17.6 parts of DOP; 8.7 parts of the phosphate plasticizer known as Santicizer-141; 12.9 parts of the calcium carbonate of Example 4; 8.0 parts of the blowing agent-plasticizer-stablizer mixture used in Example 1; 4.0 parts of the paste of blowing agent in DOP used in Example 1; 34 parts of a 12% dispersion of black pigment in DOP; 2 parts of the surfactant used in Example 1 and 3 parts of the naphtha used in Example 1. After thorough deaeration, a coating 0.008 inch thick is formed on the release paper. The assemblage (of release paper, blowable layer, non-blowing layer and fabric) is in the oven 4.6 minutes. An excellent suede is obtained on sanding.

The polyvinyl chloride D-100 has the characteristics given in Table I hereafter; that Table I is taken from the booklet "Pliovic D-100X Technical Data" published by Goodyear Tire & Rubber Co. The Marvinol VR-53 has a specific gravity of 1.4, a specific viscosity of 0.36, an apparent density of 15 pounds per cubic foot, an average particle size of 1.7 microns and a methanol extractible content of 3%; the specific $$\text{viscosity} = \frac{\text{solution viscosity}}{\text{solvent viscosity}} - 1$$

using a solution of 0.2 g. polymer in 50 ml. nitrobenzene; this information is taken from the booklet "Marvinol VR-53" by Werner and Heinrichs, published by United States Rubber. The Bakelite QY JV-1 is a medium molecular weight homopolymer of vinyl chloride, similar to the Marvinol VR-53.

The high flash naphtha used in the foregoing examples contains 98.9% aromatics, has a flash point (Tag closed cup) of 107° F., a mixed aniline cloud point of 57° F., a kauri butanol value of 91° F., a specific gravity of 0.873 and shows the following ASTM distillation characteristics: initial B.P. 311° F., 50% 320° F., 90% 329° F., end point 344° F.

The Argus Mark 282 stabilizer is a zinc liquid stabilizer/activator having a specific gravity of 1.042 at 25° C.; and a refractive index of 1.4475. It has the property of causing the azodicarbonamide to decompose rapidly at a temperature of about 329° F. That is, when the temperature of a mixture of 300 grams of DOP, 1 gram of azodicarbonamide and 6 grams of the activator is raised steadily, it is found that about 40 ml. of gas have been evolved when when the temperature reaches 329° F., and that gas evolution is substantially complete when the temperature reaches 356° F.; the total gas evolution per gram of azodicarbonamide is known to be about 225 cc. (measured at STP). In contrast, when no activator is present (again, in a mixture of 300 grams DOP and 1 gram of azodicarbonamide) the evolution of 40 ml. of gas does not occur until the temperature reaches about 390° F. The Argus Mark 229 stabilizer is a cadmium-zinc liquid stabilizer having a specific gravity at 25° C. of 0.930 and a refractive index of 1.4420. It has the property of causing the azodicarbonamide to decompose rapidly at a temperature of about 176° F. (according to the 40 ml. gas evolution test described above, gas evolution in this case being substantially complete when the temperature reaches 293° F.). Other activators and their characteristics are well known to those skilled in the art; see the article by E. B. Harris "Evaluation of Variables Pertinent to the Preparation of Vinyl Foam" in Journal of Cellular Plastics, April 1965, pages 296–300, and the article by L. I. Nass "Compounding of Low Density Vinyl Foams" (parts 1 and 2) in Modern Plastics, March 1963, pages 151 ff. and April 1963, pages 127 ff. The published data indicates that zinc octoate has activating characteristics similar to those of Mark 282.

The pigment dispersions used in the foregoing examples generally contain about 30% finely divided pigment (of the type usually employed in vinyl plastisol formulation, such as those pigments known as medium chrome yellow, Rex orange, titanium RA-45, Hoover black, Chili red, etc., or mixtures of any of these to obtain the desired color), 14½% Paraplex G-50 (a well known polymeric polyester plasticizer having a molecular weight of 2200 and a saponification number of 500), 6½% Paraplex G-62 (epoxidized soybean oil) and 49% Santicizer 160 (butyl benzyl phthalate). For black pigment dispersions the proportion of pigment is usually less; thus the pigment dispersion may contain 15% black pigment (such as Mogul A black), 26% Paraplex G-50, 10% Paraplex G-62 and 49% Santicizer 160. In Examples 3, 4, 6 and 7 the pigment dispersion contains 12% Mogul A black and 88% DOP.

In the abrading of the exposed surface of the blown layer one may employ, for example, a sandpaper whose grit has a diameter similar to the diameter of the cells, e.g. 120 grit sandpaper (whose grit particles can pass through a 120 mesh, U.S. Standard, sieve and therefore have particle diameters less than about 125 microns) or 60 grit sandpaper (whose grit particles can pass through a 60 mesh, U.S. Standard, sieve and therefore have particle diameters less than about 250 microns) or even coarser sandpaper (such as 40 grit sandpaper). The rate and conditions of abrasion are preferably such as to avoid heating the plastisol to such an extent that fused thickened portions are formed (e.g. at the upper edges of the cell walls); this can be determined by simple machine sanding trials, with the rate of abrasion being reduced or the abrading element being cooled to avoid such surface fusion.

The abrading may be supplemented or in some cases, replaced, by a treatment with a wire brush (e.g. a rapidly rotating brush having stiff wire bristles), which serves to sever cell walls, including the side walls and any surface skin (which skin constitutes the upper walls of the cells).

As previously mentioned it is preferred that the plastisol reach a fused state before significant blowing occurs. The further heating which produces the blown product appears to also increase the degree of fusion and thereby improves the strength and other physical properties of the product.

Instead of casting onto release paper one may produce the product by a direct casting technique. Thus the fabric may first be coated with a thin layer of the substantially non-blowing plastisol, which is then fused and thereafter planished, as by pressing it against a hot smooth roll to flatten any protruding portions of the fabric and smooth down the coating, after which a layer of deaerated plastisol containing blowing agent is applied onto the planished coating and heated to fuse and blow the deaerated plastisol. Although the product at this stage may have a somewhat bumpy surface and be of correspondingly uneven thickness this bumpiness may be removed, simply by the abrading step, to produce a suede-like product in which the cellular or fibrous layer is of substantially uniform thickness.

In a preferred embodiment of the invention the heating to cause foaming is effected while there is another layer (such as a layer of release paper or a layer of fabric, preferably coated) on each side of the foamable layer which is to form the elongated cells; such other layers serve to shield that foamable layer from the direct effects of the heat source (e.g. heated air or infra red) thus making more uniform the heating of that foamable layer. It is believed that this contributes to the formation of a very good elongated cell structure. While the invention has been very successfully employed using release paper (e.g. 0.006 inch thick) as one of the layers, other arrangements may be used. Thus the temporary support may be an endless stainless steel belt (e.g. some 0.005–0.01 inch in thickness) and a thin non-foaming layer of plastisol (e.g. 0.002–0.003 inch thick) may be cast onto the belt followed (preferably after gelling of that thin layer) by the layer of the foamable plastisol and, preferably after gelling of the latter, by another thin layer of non-foaming plastisol and then a layer of fabric. After the assemblage including the steel belt has been heated to expand the foamable layer to form the elongated cells, it is then cooled, the steel belt may be stripped off and the thin skin of fused plastisol which was adjacent to the belt may be removed as by abrading it off.

The non-blowing plastisol used in the foregoing examples may, if desired, be deaerated before application; it has the following composition: 100 parts of high molecular weight homopolymer of vinyl chloride (such as Diamond PVC–71 or Allied Chemical DG–322), 27 parts of DOP, 20 parts of diisodecyl adipate, 4 parts of conventional stabilizer (such as Argus Chemical KCB–4), 1 part of the surfactant used in Example 1 and 10 parts of a dispersion of pigment in a blend of 70% polymeric polyester plasticizer (Paraplex G–50 having a molecular weight of 2200 and a saponification number of 500) and 30% epoxidized soybean oil (Paraplex G–62), said pigment dispersion containing varying amounts of pigment (in the range of about 12 to 50%) depending on the color desired.

While less preferred, it is also within the broader scope of this invention to form a suede-like material by abrading a structured prepared, as described, by discontinuing the heating while the foamable layer has only a single layer of parallel cells and before those cells have become markedly elongated, the heights of the cells being about the same as their diameters, particularly when the cells have diameters less than 200 microns. It will be appreciated that in such suede-like material the bottoms of the cells will be more easily visible (especially when the material is bent convexly with the suede side outermost) than in a material made by abrading an elongated cell structure. Also, with such a material particular care should be taken to avoid removal, during abrading, of too much of the structure other than the top skin which covers the cells.

The literature indicates that gas-yielding the blowing agents such as those described above also yield nongaseous decomposition products. These generally remain, at least in part, in the layer of elongated cells. Thus the published literature on azodicarbonamide indicates that some 68% of the original weight thereof remains as solid decomposition products, including such organic compounds (containing carbon, nitrogen, hydrogen and oxygen) as urazol, biuret, cyamelide and cyanuric acid.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

TABLE I.—PLASTICIZER LEVEL STUDY FOR PLIOVIC D–100X

[Base formula: Resin, 100 parts; DOP, varying; Paraplex G–62, 5 parts; Advastab BC110, 2.5 parts]

| | | | | | | |
|---|---|---|---|---|---|---|
| DOP | 45 | 55 | 65 | 75 | 85 | 95 |
| G–62 | 5 | 5 | 5 | 5 | 5 | 5 |
| Total plasticizer level | 50 | 60 | 70 | 80 | 90 | 100 |
| Brookfield viscosities in poise at— | | | | | | |
| 1 hour: | | | | | | |
| 2 r.p.m | 128 | 47 | 29 | 14 | 10 | 8 |
| 20 r.p.m | 90 | 41 | 26 | 12 | 9 | 9 |
| 1 day: | | | | | | |
| 2 r.p.m | 210 | 68 | 31 | 18 | 13 | 10 |
| 20 r.p.m | 167 | 61 | 32 | 16 | 12 | 9 |
| 1 week: | | | | | | |
| 2 r.p.m | 440 | 92 | 45 | 20 | 15 | 10 |
| 20 r.p.m | 272 | 84 | 39 | 19 | 13 | 10 |
| 2 weeks: | | | | | | |
| 2 r.p.m | 748 | 125 | 53 | 18 | 12 | 8 |
| 20 r.p.m | 382 | 96 | 44 | 20 | 13 | 9 |
| 4 weeks: | | | | | | |
| 2 r.p.m | 830 | 157 | 61 | 31 | 15 | 9 |
| 20 r.p.m | 380 | 103 | 47 | 28 | 17 | 12 |
| Severs viscosity, 1 day, 0.316 cm. orifice, in poise at— | | | | | | |
| 10 p.s.i | 504 | 168 | 196 | 116 | 38 | 35 |
| 40 p.s.i | 423 | 170 | 84 | 25 | 16 | 15 |
| 70 p.s.i | 542 | 122 | 57 | 23 | 18 | 14 |
| 100 p.s.i | 642 | 139 | 52 | 23 | 18 | 16 |
| Gelation temperature, °F | 173.5 | 184 | 186.5 | 194.5 | (*) | (*) |
| Ultimate tensile, p.s.i | 2,600 | 2,350 | 2,150 | 1,900 | 1,700 | 1,500 |
| Ultimate elongation, percent | 360 | 385 | 410 | 430 | 455 | 480 |
| Shore A hardness | 87 | 81 | 75 | 69 | 64 | 60 |
| Graves tear, lbs./in | 371 | 319 | 262 | 221 | 187 | 163 |
| Solenoid brittle point, °C | −28.5 | −36.3 | −39.9 | −40.5 | −46.5 | −47.1 |

*Stock fused 10 minutes on single strength glass plate 1350° F.

We claim:

1. Process for the production of suede-like materials from polyvinyl chloride plastisol, which comprises forming on a backing a layer of deaerated foamable plastisol containing heat-decomposable blowing agent, and heating said layer to fuse said plastisol and decompose said blowing agent to form a fused layer containing side-by-side substantially parallel cells which are elongated vertically (i.e. in a direction transverse to the plane of said layer), cooling said fused layer and severing cell walls of said parallel cells, the duration and temperature of said heating being such that on said cooling the structure of the resulting solidified fused layer is characterized by said elongated substantially parallel cells.

2. Process as in claim 1 in which said severing is effected by abrading.

3. Process as in claim 1 in which said cells have diameters in the range of about 100 to 300 microns, their dimensions in the direction of elongation being greater than their diameters and being within the range of about 250 to 1000 microns.

4. Process as in claim 1 in which said foamable plastisol layer is about 100 to 400 microns thick.

5. Process as in claim 1 in which said foamable plastisol layer has one surface adjacent to said backing and its opposite surface in contact with a temporary support which is substantially non-adherent to the fused plastisol.

6. Process as in claim 5 in which said backing is a fibrous fabric.

7. Process as in claim 6 in which at least one other layer of fusible polyvinyl chloride plastisol is spread between said foamable layer and said fabric, said other layer being fused by said heating.

8. Process as in claim 7 in which said other layer is of non-foamable plastisol and has a thickness in the range of about 20 to 300 microns and is spread onto said foamable layer, after which said fabric is applied to said other layer.

9. Process as in claim 1 in which said blowing agent is azodicarbonamide.

10. Process as in claim 5 in which said solidified fused layer has a surface skin covering said cells, forming transparent windows across the tops of said cells and being less than 50 microns in thickness over most of its area, said process including the step of severing the skin to expose the cellular structure.

11. Process as in claim 1 in which said heating is discontinued when the blow ratio is within the range of about 2½:1 to 5:1.

12. Process as in claim 1 and including the steps of heating to form a fused layer of said foamable plastisol, said fused layer having squat cells which are side-by-side and occupy almost the full thickness of said fused layer, and continuing said heating whereby said cells expand in a direction transverse to said fused layer and form said elongated cells.

13. Process as in claim 12 in which said continued heating is discontinued by cooling the material when the blow ratio is within the range of about 2½:1 to 5:1.

14. Process for the production of suede-like materials from polyvinyl chloride plastisols, which comprises forming on a backing a layer of deaerated foamable plastisol containing heat-decomposable blowing agent, which layer is in contact with a temporary support, and heating said layer to fuse said plastisol and decompose said blowing agent to form a fused layer whose thickness is made up of a single layer of substantially parallel cells which are side-by-side and are separated by thin vertical walls and which are covered with a surface skin in contact with said temporary support, the vertical dimension of said cells being at least about as great as the horizontal dimension, cooling said fused layer and severing said surface skin to expose the vertical cell walls of said parallel cells.

15. Process as in claim 14 in which said surface skin is less than 50 microns in thickness over most of its area, said cells having diameters measured in the horizontal direction in the range of about 100 to 300 microns.

16. Process as in claim 15 and including the steps of heating to form a layer of fused plastisol having squat cells which are side-by-side and occupy almost the full thickness of said fused layer, and continuing said heating whereby said cells expand in a direction transverse to said fused layer and form elongated cells.

References Cited

UNITED STATES PATENTS

| | | | |
|---|---|---|---|
| 3,459,274 | 8/1969 | MacPhail | 161—160 X |
| 3,312,586 | 4/1967 | Barlow | 156—154 |
| 3,547,753 | 12/1970 | Sutton | 161—160 |
| 3,378,612 | 4/1968 | Dietz | 161—160 X |
| 2,694,029 | 11/1954 | Skinner | 156—154 |
| 3,446,693 | 5/1969 | Alig et al. | 156—79 |
| 2,811,464 | 10/1957 | Stiehl et al. | 117—11 |
| 3,041,193 | 6/1962 | Hamway et al. | 117—11 |

OTHER REFERENCES

Werner, "Formulating Chemically Blown Plastisol Foam," Modern Plastics, October 1961, pp. 135–138, 141, 142, 145 and 227.

DANIEL J. FRITSCH, Primary Examiner

U.S. Cl. X.R.

117—11; 156—78, 154, 156, 246, 247, 270; 161—159, 160, Digest 2; 264—47, 48